PANEL STRUCTURE FOR SOFT-SIDED LUGGAGE

Original Filed March 26, 1965 2 Sheets-Sheet 1

INVENTOR.
MICHAEL KISH, JR.
BY
OSTROLENK, FABER, GERB & SOFFEN
ATTORNEYS

PANEL STRUCTURE FOR SOFT-SIDED LUGGAGE

Original Filed March 26, 1965 2 Sheets-Sheet 2

INVENTOR
MICHAEL KISH, JR.
BY
OSTROLENK, FABER, GERB & SOFFEN
ATTORNEYS

United States Patent Office

Re. 26,443
Reissued Aug. 27, 1968

26,443

PANEL STRUCTURE FOR SOFT-SIDED LUGGAGE

Michael Kish, Jr., Hightstown, N.J., assignor to Atlantic Products Corporation, Trenton, N.J., a corporation of New Jersey Original No. 3,266,604, dated Aug. 16, 1966, Ser. No. 443,019, Mar. 26, 1965, which is a continuation-in-part of Ser. No. 387,390, Aug. 4, 1964. Application for reissue Feb. 13, 1967, Ser. No. 617,440
5 Claims. (Cl. 190—41)

Matter enclosed in heavy brackets [ ] appears in the original patent but forms no part of this reissue specification; matter printed in italics indicates the additions made by reissue.

*ABSTRACT OF THE DISCLOSURE*

*A carrying bag having flexible sides, one of which has a U-shaped flap with a zipper closure. The U-shaped opening in the panel receiving the flap has a zipper half extending from its interior surface, while the flap has a cooperating zipper half extending from its interior surface. The zipper fabrics envelop around the edges of the flap and panel, with the flap being pulled over the opening to cover the zipper when the zipper is closed. A reinforcing wire is secured to the edge of the opening.*

This application relates to a novel panel and zipper construction for soft-sided luggage, and is a continuation-in-part application of my copending application Serial No. 387,390, filed Aug. 4, 1964, entitled "Method of Manufacture for Luggage," and assigned to the assignee of the present invention *which issued on February 21, 1967 as U.S. Patent 3,305,052.*

Soft-sided luggage is in general use, and is generally comprised of a main tubular frame body wherein fabric or fabric-type panels extend over the ends of the tube to define the sides of the luggage. Thereafter, a zipper opening is placed in one of the panels to define a flap to provide access to the interior of the bag.

The principle of the present invention is to provide a novel closure arrangement for panels of this general type wherein the cooperating zipper halves connected to the panel are connected in such a manner that the zipper is completely hidden when closed, and so that the panel portion secured to the bag support is provided with a reinforcing wire therein to provide rigidity for this portion when the panel is either opened or closed.

Accordingly, a primary object of this invention is to provide a novel zipper arrangement for soft-sided luggage wherein the panel remains relatively rigid and stiff when the flap therein is opened.

Another object of this invention is to provide a novel zipper arrangement for soft-sided luggage.

A still further object of this invention is to provide a novel zipper arrangement of soft-sided luggage having an openable panel in one side thereof wherein the panel is provided with a reinforcing wire and a hidden zipper.

These and other objects of this invention will become apparent from the following description when taken in connection with the drawings, in which.

Figure 1:
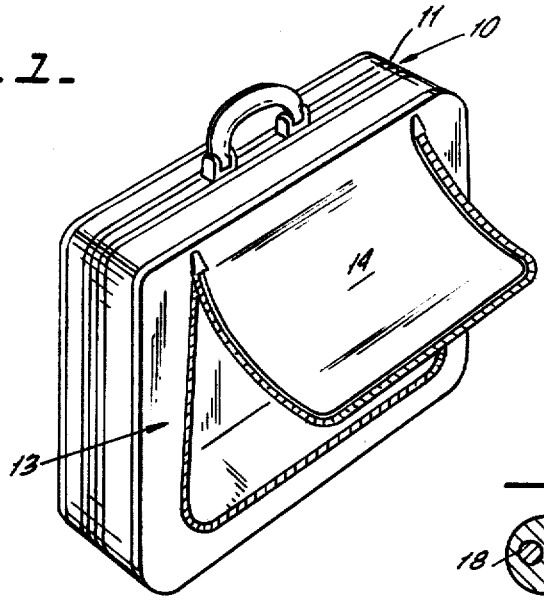
FIGURE 1 is a perspective view of the type of soft-sided luggage to which the present invention applies.
Figure 2:
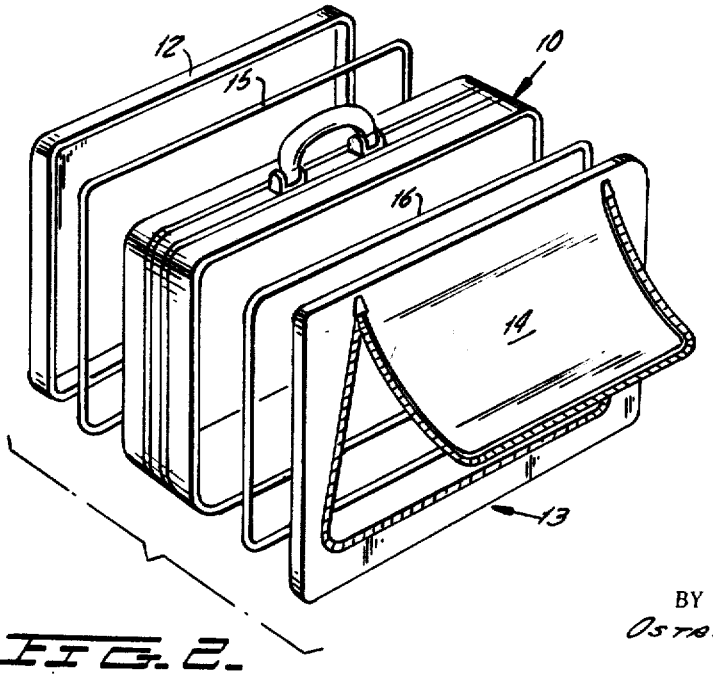
FIGURE 2 is an exploded perspective view of the luggage of FIGURE 1.

Referring now to FIGURES 1 and 2, I have illustrated therein a typical soft-sided luggage to which the invention applies which includes a frame body 10 which may have reinforcing members 11 extending therefrom in the manner disclosed in my *U.S. Patent 3,305,052* [copending application Serial No. 387,390]. This rigid frame body is then provided with a continuous rear panel 12 and a front panel 13 which has a flap opening 14 therein to provide access to the interior of the bag.

Figure 4:
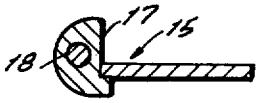
FIGURE 4 is a cross-sectional view of a reinforced welt used in the securement of the panels to the frame.
Figure 3:
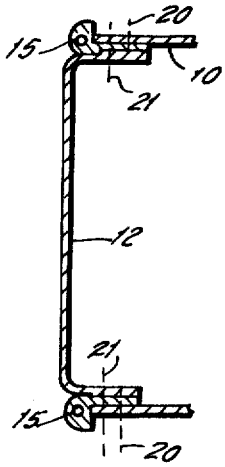
FIGURE 3 is a cross-sectional view illustrating the manner in which the panels of FIGURE 2 are secured to the main frame body.

The panels 12 and 13 are connected to the frame 10 by means of welts 15 and 16, best shown in FIGURES 3 and 4. Thus, in FIGURE 4, the welt 15 (which is identical to welt 16) is provided with an enlarged head portion 17 which may have a reinforcing wire 18 extending therethrough.

As illustrated in FIGURE 3, the welt 15 is interposed between the inwardly bent legs of panel 12 and the edge of frame 10. More particularly, the extending section of welt 15 may first be sewn to frame 10 on the stitch line 20 with this subassembly thereafter being sewn to the panel 12 along the stitch line 21. Alternatively, the welt 15 can be first sewn to the panel 12 and thereafter sewn to the frame 10 so that only one stitch line is viewed from the external side of frame 10. Note that the welt 15 of FIGURES 3 and 4 could be constructed in the manner identical to that illustrated in my above noted copending application Serial No. 387,390 wherein the welt has a reentrant portion for completely receiving the inwardly bent sections of panel 12.

Figure 5:
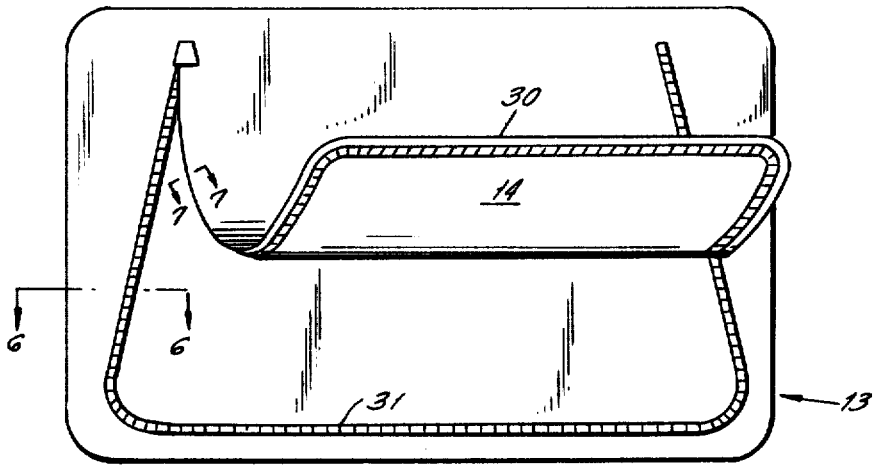
FIGURE 5 is a front view of the panel of FIGURES 1 and 2 which has a flap therein.

The panel 13 which has the flap 14 therein is best shown in FIGURE 5 wherein FIGURE 5 illustrates a zipper portion 30 connected about the periphery of flap 14 and a cooperating zipper portion 31 connected about the periphery of the opening in panel 13.

Figure 6:
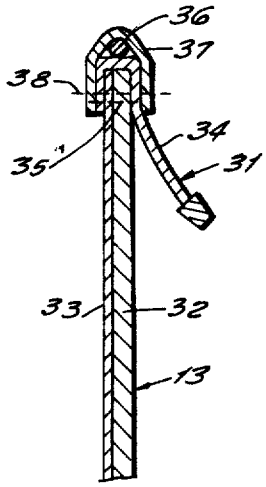
FIGURE 6 is a cross-sectional view of the panel of FIGURE 5 taken across the lines 6—6 in FIGURE 5 to particularly illustrate the novel manner in which a reinforcing wire is connected to the periphery of the panel opening and the novel manner in which the zipper is connected to the panel opening.
Figure 7:
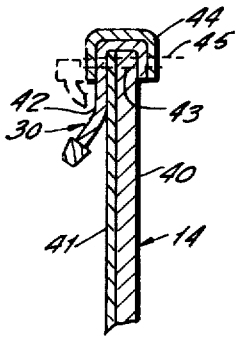
FIGURE 7 is a cross-sectional view of FIGURE 5 taken across the lines 7—7 in FIGURE 5 particularly to illustrate the manner in which the cooperating zipper half is connected to the flap.

The manner in which zipper portions 30 and 31 are secured to flap 14 and panel 13, respectively, is best shown in FIGURES 7 and 6, respectively. Referring first to FIGURE 6, there is illustrated therein a cross-sectional view through the panel portion 13. It is to be noted in FIGURE 6 that the front of the panel is on the right of the drawing. Thus, the panel is formed of a main body 32 of any suitable flexible material which could have an interior lining 33 secured thereto.

The zipper half 31 is provided with the usual extending fabric section 34 which is shown as being folded around the end of the interior of the opening in panel 13 and sewn thereto as by the stitch line 35. Note that the zipper end is adjacent the front of the panel.

Thereafter, and in accordance with the invention, a rigid steel wire 36 is placed adjacent the end of panel 13 and on top of the zipper fabric 34, and a fabric cover 37 is wrapped about the wire and over the end of the periphery of the opening in panel 13 and is sewn thereto as by the stitch line 38 so as to hold the wire 36 in position. Note that the wire 36 extends completely around the full length of the opening in panel 13.

Thus, when the flap 14 is open, and even when the flap 14 is closed, the wire 36 provides substantial rigidity to the normally flexible fabric, thereby substantially improving the appearance of the product and increasing its ability to resist wear and to retain its shape even under adverse conditions of use.

Turning next to FIGURE 7, there is illustrated therein the manner in which the zipper half 30 is secured to the end of flap 14. Note that in FIGURE 7 the external surface of the flap 14 is at the right of the drawing so that the flap is comprised, for example, of the desired flap material 40 which could have an interior lining 41 which is similar to lining 33.

The zipper half 30 which has an extending fabric portion 42 in the usual manner is then folded around the end of flap 14, and is sewn thereto as along the stitch line 43. Thereafter a flap of a suitable finishing material 44 may be sewn about the end of the complete assemblage, as illustrated, along the stitch line 45. Note that in FIGURE 7 the zipper 30 extends along the rear surface of the flap.

Figure 8:
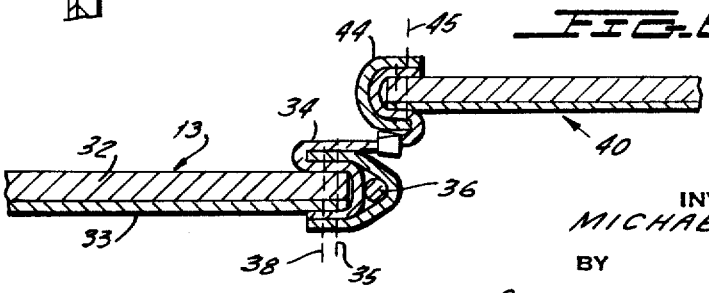
FIGURE 8 is a cross-sectional view of the arrangements shown in FIGURES 6 and 7 when the zipper is closed and illustrates the manner in which the zipper is hidden.

This novel zipper arrangement then operates as illustrated in FIGURE 8 wherein, when the zipper is closed, the end of flap 14 will be pulled over the top of the exterior of panel 13, since the zipper fabric 42 has a shorter length than the zipper fabric 34. Therefore, the zipper closure will be completely hidden from external view, and will be protected from abusive handling.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. In a carrying bag; a main enclosed frame having first and second side panels enclosing the ends of said frame; one of said side panels having a U-shaped flap therein cooperating with a U-shaped opening therein; and zipper means extending between the edge of said U-shaped flap and the edge of said U-shaped opening to secure said flap to said one of said side panels and to provide access to the interior of said bag when said zipper means is open; said zipper means comprising first and second cooperating zipper halves having respective extending fabric portions for securement of said zipper halves; and an elongated rigid metallic reinforcing wire; first and second connection means; said fabric portion of said first zipper portion and said reinforcing wire conected along the full length of the said edge of said U-shaped opening in said one of said panels by said first connection means; said fabric portion of said second zipper portion connected along the full length of said edge of said U-shaped flap by said second connection means; said first zipper half having a free edge extending outwardly from the exterior surface of said one of said panels adjacent its said edge; said second zipper half having a free edge extending outwardly from the interior surface of said flap.

2. The carrying bag substantially as set forth in claim 1 wherein said first and second connection means include lines of stitching connecting said respective zipper halves to the surfaces adjacent said respective edges of said U-shaped opening in said one of said panels and said flap.

3. The carrying bag substantially as set forth in claim 1 wherein said outwardly extending free edge of said second zipper half has a length shorter than the distance from the beginning of said free edge to said edge of said flap whereupon said edge of said flap is pulled over to top of said edge of said U-shaped opening when said zipper is closed.

4. The carrying bag substantially as set forth in claim 2 wherein said first connection means further includes an elongated fabric strip lapped over said edge of said U-shaped opening and secured to the opposing surfaces of said U-shaped opening adjacent its said edge; said wire interposed between said edge and the interior of said elongated fabric strip.

*5. In a carrying bag; a main enclosed frame having first and second side panels enclosing the ends of said frame; one of said side panels having a U-shaped flap therein cooperating with a U-shaped opening therein; and zipper means extending between the edge of said U-shaped flap and the edge of said U-shaped opening to secure said flap to said one of said side panels and to provide access to the interior of said bag when said zipper means is open; said zipper means comprising first and second cooperating zipper halves having respective extending fabric portions for securement of said zipper halves; first and second connection means; said fabric portion of said first zipper portion enveloping around the full length of the said edge of said U-shaped opening and connected along the full length of the said edge of said U-shaped opening in said one of said panels by said first connection means; said fabric portion of said second zipper portion enveloping around the full length of the said edge of said U-shaped flap and connected along the full length of said edge of said U-shaped flap by said second connection means; said first zipper half having a free edge extending outwardly from the exterior surface of said one of said panels adjacent its said edge; said second zipper half having a free edge extending outwardly from the interior surface of said flap.*

References Cited

The following references, cited by the Examiner, are of record in the patented file of this patent or the original patent.

UNITED STATES PATENTS

| | | | |
|---|---|---|---|
| 2,288,105 | 6/1942 | Plotkin | 190—48 |
| 2,316,133 | 4/1943 | Schaaff | 24—205.1 |
| 2,684,135 | 7/1954 | Cart | 190—41 |
| 2,746,581 | 5/1956 | Ritter | 190—41 |
| 2,985,265 | 5/1961 | Gehrie | 190—41 |
| 2,634,836 | 4/1953 | Warren | 190—48 |

FOREIGN PATENTS

| | | |
|---|---|---|
| 658,864 | 10/1951 | Great Britain. |

DONALD F. NORTON, *Primary Examiner.*